(12) United States Patent
Kothari et al.

(10) Patent No.: US 12,134,332 B2
(45) Date of Patent: Nov. 5, 2024

(54) PROTOCOL FOR DISCHARGING DC POWER FROM PROPULSION BATTERY PACK TO OFFBOARD CHARGING STATION

(71) Applicant: GM GLOBAL TECHNOLOGY OPERATIONS LLC, Detroit, MI (US)

(72) Inventors: Aniket P. Kothari, Rochester Hills, MI (US); Bryan T. Sauter, New Hudson, MI (US); Ian Forsman-Kendall, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 539 days.

(21) Appl. No.: 17/546,162

(22) Filed: Dec. 9, 2021

(65) Prior Publication Data

US 2023/0182601 A1 Jun. 15, 2023

(51) Int. Cl.
*B60L 53/62* (2019.01)
*B60L 53/65* (2019.01)
*B60L 53/66* (2019.01)

(52) U.S. Cl.
CPC ............ *B60L 53/62* (2019.02); *B60L 53/65* (2019.02); *B60L 53/66* (2019.02)

(58) Field of Classification Search
CPC ........... B60L 53/65; B60L 53/66; B60L 53/62
See application file for complete search history.

(56) References Cited

U.S. PATENT DOCUMENTS

2009/0063680 A1* 3/2009 Bridges .................. B60L 53/20
709/224

OTHER PUBLICATIONS

Izumi et al., "Bidirectional Charging Unit for Vehicle-to-X (V2X) Power Flow", SEI Technical Review, No. 79, Oct. 2014.

* cited by examiner

*Primary Examiner* — Robert Grant
(74) *Attorney, Agent, or Firm* — Quinn IP Law

(57) ABSTRACT

A method for coordinating a discharge session in which direct current power is offloaded from a power supply, e.g., of an electric vehicle (EV), to a bidirectional offboard charging station includes, in response to connection of the power supply to the charging station via a charging cord set, exchanging charging data between the EV and charging station. This occurs over a low-voltage communication line, with charging data including power and current limits of the EV and charging station. In response to the limits being indicative of negative limits, with the negative limits representing a request for the discharge session, the method includes transmitting the EV power and current limits to the charging station to confirm the request. The discharge session is initiated in response to confirming the request through an exchange of a unique identifier indicating support for the discharge session.

20 Claims, 2 Drawing Sheets

PROTOCOL FOR DISCHARGING DC POWER FROM PROPULSION BATTERY PACK TO OFFBOARD CHARGING STATION

INTRODUCTION

Hybrid electric, full electric vehicles, and extended-range electric vehicles, collectively referred to herein as EVs for simplicity, are equipped with an electrified powertrain system in which one or more electric traction motors are energized by a propulsion battery pack to generate drive torque. Generated drive torque from the motor(s) is ultimately directed to the vehicle's road wheels to propel the vehicle. Constituent electrochemical battery cells of the propulsion battery pack may be recharged via a plug-in process during which the battery pack is electrically connected to offboard Electric Vehicle Supply Equipment (EVSE) station, e.g., using an SAE J1772-compatible cord set. A similar battery pack may be used as part of a rechargeable energy storage system (RESS) with stationary systems, such as but not limited to power plants, hoists, conveyor systems, and the like.

As appreciated in the art, plug-in charging involves two-way communication of data between the EV and the offboard charging station, with the data taking the form of a low-voltage control pilot (CP) signal, typically 0-12V, and a 0-5V proximity voltage signal. An established J1772 connection, for instance, allows respective processors of the charging station and the EV to communicate with each other using Power Line Communication (PLC), which in turn progresses in accordance with an established communications protocol via a coordinated exchange of data messages. The CP signal is typically used to verify two-way connection between the charging station and the EV, to communicate charging states, e.g., using a predetermined duty cycle variation during AC charging or a fixed duty cycle during DC charging, and to adjust the charging rate as needed. The emergence of bidirectional-capable chargers provides a myriad of potential benefits to owners and operators of EVs, including vehicle-to-home (V2H), vehicle-to-grid (V2G), or vehicle-to-load (V2L) discharge sessions during which the offboard charging station receives DC power from the EV and thereafter energizes a load, possibly after converting the offloaded DC power to alternating current (AC) power via a resident AC-to-DC converter.

SUMMARY

The present disclosure pertains to modified communication protocols, related methods, and tangible storage media for offloading direct current (DC) power from an electrical system to electric vehicle supply equipment (EVSE), with the latter being a bidirectional-capable offboard charging station that, under normal conditions, is connected to available alternating current (AC) grid power. The offboard charging station may be connected to the AC grid power via a switching architecture and used as a home charging station. That is, a house or another residential or commercial building might be connected to the grid, with the charging station being plugged into an AC power outlet of such a building and operable for converting the grid power to DC power suitable for, e.g., charging a battery pack. The battery pack in this instance may include electrochemical energy storage cells, e.g., lithium-ion battery cells, arranged together or within different battery modules and configured as cylindrical, prismatic, or pouch-style battery cells. However, battery cells having other application suitable chemistries and other types of vehicles or mobile platforms having the battery pack, a fuel cell stack, or another suitable DC power supply may be contemplated within the scope of the disclosure, and therefore the described EV-based vehicle-to-grid (V2G) or vehicle-to-home (V2H) applications are exemplary of the present teachings.

As appreciated by those skilled in the art, EV owners have the option of installing a charging station at home or at a place of business for the purpose of enjoying convenient at-home charging. Use of a bidirectional-capable home charging station allows the owner to use the power supply of the EV as a standby energy supply, e.g., for providing backup power during a power outage or other event during which AC grid power is unavailable. Similar benefits may be enjoyed from other power supplies of mobile or stationary systems. During typical DC charging in a vehicle context, corresponding processors of the offboard charging station and the EV communicate with one another over low-voltage data lines passing through an EVSE charging cord set, with the processors doing so in accordance with a given communication protocol such as DIN 70121. A coordinated exchange of predetermined data signals or messages follows according to the particular protocol.

Within the scope of the present solution, when applied to the exemplary use case of EVs, the noted charging protocol is modified in a particular manner to enable respective processors of the offboard charging station and the EV to negotiate and execute a discharge session, during which DC power from the EV is offloaded or directed to the charging station, and ultimately to a load connected thereto. A modified version of DIN 70121 is used herein as an exemplary standard, with DIN 70121 commonly applied under J1772 for the Combined Charging System (CCS), and with ISO 15118 being an exemplary alternative standard for use with CCS. The disclosed approach thus acts as an alternative communication protocol when negotiating and executing the discharge session that is the subject of the present disclosure. This may occur regardless of whether the discharge session is requested by the EV or by the charging station.

In particular, a method as described in detail below enables coordination of a discharge session in which DC power is offloaded from a power supply of an electrical system to a bidirectional offboard charging station. The method according to an exemplary embodiment includes, in response to a connection of the power supply to the offboard charging station via a charging cord set, exchanging charging data between a processor of the electrical system and a processor of the offboard charging station. This exchange occurs over a low-voltage communication line, e.g., a Control Pilot (CP) line in the non-limiting context of DIN 70121, or possibly using a Controller Area Network (CAN) bus or wireless communication such as Wi-Fi, with the charging data including power and current limits of the electrical system and power and current limits of the offboard charging station. In response to the power and current limits of the offboard charging station being indicative of negative power and current limits representing a request for the discharge session, the method includes transmitting the limits of the electrical system to the offboard charging station, thereby confirming the request, and then initiating the discharge session via the processor of the electrical system in response to confirming the request.

The method may include receiving a unique identifier code from the charging station using the processor of the electrical system, and initiating the discharge session when the unique identifier code matches a predetermined identifier code on a calibrated list of approved identifier codes. The unique identifier code in a possible implementation includes at least a portion of a MAC address of the offboard charging station, e.g., the first three bytes or the entire MAC address.

The respective negative limits of the electrical system and of the offboard charging station may be communicated via an electrical signal having a protocol-specific range. A designated portion of the protocol-specific range corresponds to the negative power and current limits in this embodiment.

The protocol-specific range in a possible implementation is 0 kW to 870 kW and 0 A to 870 A, the designated portion of the protocol-specific range is 700 kW to 870 kW and 700 A to 870 A, and the designated portion of the protocol-specific range corresponds to 0 kW to −170 kW and 0 A to −170 A.

The discharge session may be characterized by an absence of a cable check process, and may occur during a power outage of grid power to the charging station.

During a current demand phase of the discharge session, the present method may include receiving a zero value via the processor of the electrical system, i.e., 0V or a negligible voltage, with the zero value being indicative of a confirmation by the offboard charging station of a continued validity status of the discharge session.

Another aspect of the disclose includes an electric vehicle (EV) having a set of road wheels and an electrified powertrain system, the latter having a processor, a DC power supply, and an electric traction motor. The DC power supply is connected to the electric traction motor, while the electric traction motor is connected to one or more of the road wheels. The processor aboard the EV is configured to coordinate a discharge session in which DC power is offloaded from the DC power supply to an offboard charging station, and is configured, in response to a connection of the DC power supply to the offboard charging station via a charging cord set, to exchange charging data with a processor of the offboard charging station over a low-voltage CP line. As noted above, the charging data includes power and current limits of the EV and power and current limits of the charging station. In response to the power and current limits of the charging station being indicative of negative power and current limits representing a request for the discharge session, the processor transmits the power and current limits of the EV to the charging station, thereby confirming the request, and then initiates the discharge session in response to confirming the request.

Also disclosed herein is a computer-readable storage medium on which instructions are recorded for coordinating a discharge session in which DC power is offloaded from a power supply of an EV to an offboard charging station. Execution of the instructions by a processor of the EV causes the EV in this embodiment, in response to a connection of the power supply to the offboard charging station via a charging cord set, to exchange charging data between the processor of the EV and a processor of the offboard charging station over a low-voltage communication line, such as the CP line. In response to the power and current limits of the charging station being indicative of negative power and current limits that represent a request for the discharge session, the processor is caused to transmit the power and current limits of the EV to the offboard charging station, thereby confirming the request. The processor thereafter initiates the discharge session via the processor of the EV in response to confirming the request.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

DETAILED DESCRIPTION

Figure 1:
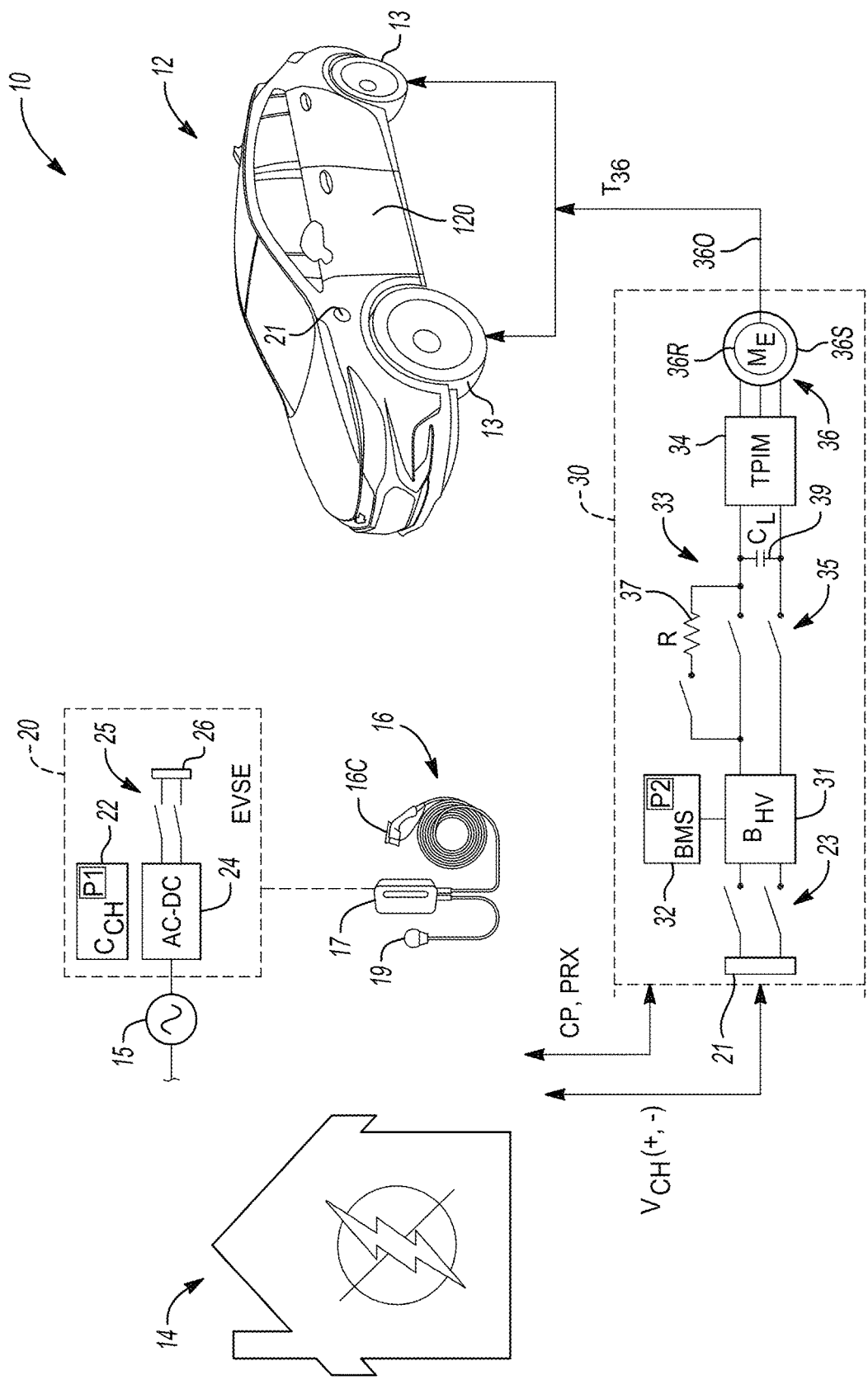
FIG. 1 is a schematic illustration of a representative discharge session in which direct current (DC) power is situationally offloaded from a power supply of an electrical system in the form of an electric vehicle (EV) to an offboard charging station, with the discharge session "handshaking" process governed by the modified protocol as described in detail herein.

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof.

Referring to the drawings, wherein like reference numbers refer to like features throughout the several views, FIG. 1 depicts a representative discharge session 10 during which an electrical system 12 is selectively connected to a load 14 via a charging cord set 16, an offboard charging station 17, and a load 14. In an exemplary use case used hereinafter for illustrative consistency, the electrical system 12 is an electric vehicle (EV), and the load 14 includes one or more loads within a house or other building. Therefore, the electrical system 12 is referred to hereinafter as the EV 12, without limitation.

Omitted for illustrative simplicity, the setup of FIG. 1 may include a suitable transfer switching architecture disposed between the charging station 17 and the load 14, with such an architecture configured to selectively connect the load 14 to available utility-supplied grid power 15 and/or to the charging station 17 as the situation warrants. The switching state of such an architecture thus determines operation in a vehicle-to-home (V2H) or vehicle-to-grid (V2G) configuration. Those skilled in the art will appreciate that the switching architecture could be or include a separate circuit, or the architecture could be fully integrated into the charging station 17.

The EV 12 includes one or more road wheels 13 connected to a vehicle body 120.

Within the scope of the present disclosure, the EV 12 is "electric" in the sense of having an electrified powertrain system 30. Output torque (arrow $T_{36}$) from the electrified powertrain system 30 is used to power one or more of the road wheels 13 and thereby propel the EV 12. The EV 12 may be variously embodied as a full electric vehicle (FEV), a plug-in hybrid electric vehicle (PHEV), or an extended-range electric vehicle (EREV), or as another electrified mobile platform having an onboard power supply 31, e.g., a multi-cell rechargeable propulsion battery pack ($B_{HV}$) as shown. The EV 12 may likewise be configured in different manners, including as a passenger sedan as shown, or a truck, crossover vehicle, sport utility vehicle, etc. Other possible configurations of the onboard power supply 31 may also exist within the scope of the present disclosure, such as a fuel cell stack. As noted above, other types of mobile or stationary systems may be used within the scope of the disclosure, such as power plants, hoists, or conveyor systems, as alternatives to the illustrated exemplary EV 12. Solely for illustrative consistency, the described discharge session 10 is described below with reference to the EV 12 in which the onboard power supply 31 is configured as a rechargeable propulsion battery pack, e.g., as a lithium-ion battery, without limiting the scope of the disclosure to mobile or vehicular applications.

The load 14 of FIG. 1 may be collectively presented by a residential or commercial building and its various connected systems, components, and devices typically residing within or connected to such a structure. Although omitted for illustrative simplicity, those skilled in the art will appreciate that such connected devices typically include lights, air conditioning units, fans, furnace blowers, sump pumps, kitchen appliances, televisions, and the like. Under normal operating conditions, the load 14 is connected to and driven by grid power 15. The grid power 15 in a typical residential usage scenario would entail utility-provided alternating current (AC) power. Thus, an owner or operator of the EV 12 may choose to equip a home office or other building with the EVSE charging station 17 so as to enjoy the convenience of home charging.

As appreciated in the art, the charging station 17 includes a charging circuit 20, which in turn is shown in simplified form in FIG. 1 to illustrate certain core components, i.e., a local charge controller ($C_{CH}$) 22 having a processor P1, an AC-to-DC converter 24, one or more charge contactors 25, and a charge receptacle 26. The AC-to-DC converter 24 is used to convert the AC grid power 15 to DC power for the purpose of performing a DC charging operation of the onboard power supply 31. To that end, the charge contactor(s) 25 located on a DC-side of the AC-to-DC converter 24 are commanded to close by the processor P1 to thereby connect the AC-to-DC converter 24 to the charge receptacle 26.

In a typical DC charging scenario in which the grid power 15 is available to the charging station 17, the charging station 17 is connected to the grid power 15 via an AC plug 19 of the EVSE cord set 16. A charging plug 16C, e.g., a multi-pin J1772 connector as generally described above, is connected to a corresponding charging port 21 located on the EV 12. In accordance with the DIN 70121 protocol or other relevant protocol, DC charging power, shown as $V_{CH}$ (+, -) in FIG. 1, is fed through conductive pins of the charging port 21, across a set of main battery contactors 23, and to the onboard power supply 31. The entire charging process is coordinated via an exchange of data/messages between the processor P1 of the charge controller 22 and a corresponding processor P2 of a resident controller 32 of the EV 12, in this non-limiting example a Battery Management System. As appreciated in the art, during a pre-charge stage conducted, e.g., during a power outage prior to a discharge session, a contactor control sequence proceeds by opening the contactors 25 of the offboard charging station and thereafter detecting the DC link voltage across a DC link capacitor. In response to the DC link voltage being at or near 0 volts, with "near" being a negligibly low voltage level such that the DC link voltage is treated as being at 0V, the contactors of the EV are closed in a predetermined sequence, i.e., main battery contactors 23, followed by the contactors 35.

The above-noted CP and PRX signals are exchanged between the processors P1 and P2 as described above, with the general process of DC charging under DIN 70121 being well understood in the art. As described below, the DIN 70121 standard or another relevant standard is modified herein to enable the reverse process to occur, i.e., for the onboard power supply 31 to selectively energize the charging station 17 and thus the load 14, which would be beneficial when the grid power 15 is not unavailable, such as during a power outage.

Still referring to FIG. 1, the electrified powertrain system 30 uses available energy from the onboard power supply 31 to energize powered rotation of the road wheels 13. To that end, the electrified powertrain system 30 includes at least one electric traction motor 36 having an output member 360 coupled to one or more of the road wheels 13. In the illustrated embodiment, the electric traction motor (ME) 36 is embodied as an AC machine having a rotor 36R disposed radially within a stator 36S, with the latter connected to the output member 360. A traction power inverter module (TPIM) 34 is connected to the individual phase windings of the stator 36S, with internal switching control of semiconductor switches (not shown) used to convert DC input power from the onboard power supply 31 into AC output power suitable for energizing the stator 36S. In this manner, the motor torque $T_{36}$ is ultimately generated for the purpose of propelling the EV 12.

Between the onboard power supply 31 and the TPIM 34 is disposed a high-voltage contactors 35, with one such contactor 35 connected in series with a pre-charge resistor (R) 37. As appreciated in the art, the purpose of the collective set of electrical components is to prevent arcing and inrush currents when connecting the onboard power supply 31 of the EV 12 to the DC voltage bus and connected components, principally the TPIM 34 and electric traction motor 36. The same pre-charge circuit components are also used by present modified protocol during the discharge session, with the charging station 17 opening its charge contactors 25 while the EV 12 charges up a DC link capacitor 39 by closing the contactor 35 in series with the resistor 37, and then the main battery contactors 23.

Figure 2:
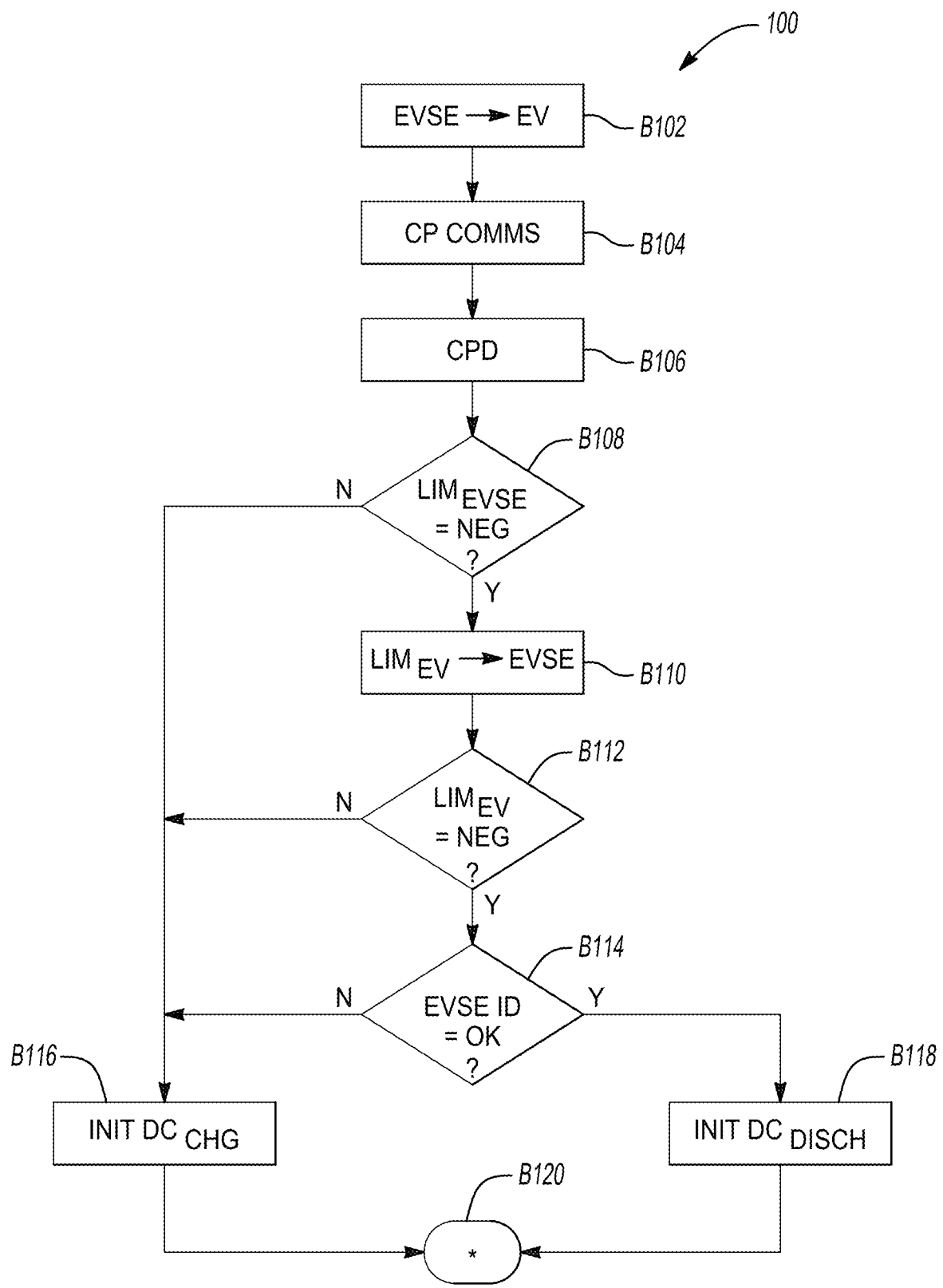
FIG. 2 is a flow chart describing a representative embodiment of a method for performing the discharge session as illustrated in FIG. 1.

Discharge Session: referring now to FIG. 2, a method 100 enables coordination and control the various hardware components of FIG. 1 during a discharge session. In the contemplated discharge session, DC power from the onboard power supply 31 is fed into the EVSE charging station 17 for the purpose of powering the load 14, e.g., during a utility power outage. As understood in the art, DIN 70121 and other relevant charging standards proceed in accordance with a defined multi-step handshaking process before permitting transfer of energy from the charging station 17 to the EV 12. The present solution involves modifying an existing protocol and handshaking sequence.

As an example standard, one may modify the DIN 70121 V2G communication layer message request response pairs as shown in bold:

| # | MESSAGE NAME | MESSAGE INTENT |
|---|---|---|
| 1 | Supported Application Protocol | Confirm protocol version and schema ID. |
| 2 | Session Setup | EV requests V2G; EVSE responds. |
| 3 | Service Discovery | EVSE indicates type of charging services, etc. |
| 4 | Service & Payment Selection | EV requests method of payment; EVSE confirms. |
| 5 | Contract Authentication | EVSE indicates whether charge session authorized. |
| 6 | Charge Parameter Discovery | EVSE, EV exchange negative power/current limits. |
| 7 | Cable Check | EVSE isolation check, if grid power available. |
| 8 | Pre-Charge | EVSE opens its contactors; EV charges DC link. |
| 9 | Power Delivery | EV requests that EVSE enables EVSE output. |
| 10 | Current Demand Request | EV sends zero current for current command; EVSE determines how much current will be sourced from EV. |
| 11 | Power Delivery | EV requests that EVSE disables the EVSE output. |
| NA | Welding Detection (optional) | Optional. |
| 12 | Session Stop | EV requests termination of PLC communication session. |

The above response pairs are therefore used during a requested discharge session to perform the requisite handshaking sequence preparatory to a power offload to the charging station 17.

A representative embodiment of the method 100 commences with block B102, with the charging station 17 of FIG. 1 being connected to the EV 12 ("EVSE-EV"), i.e., by plugging the charging plug 16C of the charging cord set 16 into the charge port 21 of the EV 12. Such a use case entails plug-in, followed immediately by the described actions. One skilled in the art will appreciate that other V2H scenarios may arise, such as the charging cord set 16 remaining plugged into the EV 12, e.g., overnight charging, with a power outage occurring sometime after charging is initiated or completed. In either case, block B102 includes establishing or verifying prior establishment of positive and negative DC connections, along with the noted CP and PRX connections. The method 100 then proceeds to block B104.

Block B104 ("CP COMMS") entails establishing a data connection via a low-voltage communication line, exemplified herein as CP power line communication. As appreciated in the art, the control pilot (CP) pin on the charging plug 16C enables bidirectional communication to occur between the EV 12 and the charging station 17. During a normal charging session, the exchanged data would include a maximum charging current and power that the EV 12 requires and is able to receive, as well as a maximum charging current and power that the charging station 17 is equipped to provide. In the present protocol for a discharge session, however, this data is modified to include signals indicative or representative of negative power and current limits. The method 100 proceeds to block B106 once two-way connection has been established using the charging cord set 16.

At block B106, the processors P1 and P2 of FIG. 1 commence charge parameter discovery ("CPD"). As modified herein, CPD involves the EV 12 communicating its normal power and current limits to the charging station 17 over the established power line connection through the EVSE cord set 16. In turn, the charging station 17 provides its power and current limits to the EV 12. However, the manner in which block B106 is conducted differs markedly from the data exchange of a typical charging session.

In particular, DC current and power signals communicated over the low-voltage CP power line, according to the DIN 70121 protocol in this exemplary implementation, have a protocol-specific power range of 0 kW to 870 kW and a current range of 0 A to 870 A. An upper portion of the designated range is currently unused based on the capabilities of the types of EVSE charging stations currently available on the market, with typical residential discharge power and current capabilities having relatively low magnitudes of less than 20 kW and 50 A, respectively. For entry into the discharge mode contemplated herein, during which the load 14 of FIG. 1 is disconnected from the AC grid power 15, the charging station 17 is provided with the ability to communicate to the EV 12 a need for DC power from the onboard power supply 31.

To this end, implementation of block B106 may involve artificially extending the above-described power and current limits into the negative range. One way of doing this in the noted 0 kW to 870 kW and amp (A) ranges is to reserve an upper portion of the stated range as corresponding to negative limits, with values in this designated negative range signaling a need for offloading of DC power from the onboard power supply 31 to the charging station 17. For instance, the upper range 700 kW to 870 kW and 700 A to 870 A could be assigned to the negative range of 0 kW to −170 kW and 0 A to −170 A, such that communication of 750 kW via a low-voltage AC signal over the CP power line represents −50 kW, i.e., a need for offloading 50 kW of power from the onboard power supply 31. Similarly, 800 kW in this example would signal a need for 100 kW from the onboard power supply 31, and so forth.

As part of block B106, the EV 12 and the charging station 17 exchange such negative power and current limits during the CPD stage in the following order: EV 12, to charging station 17, to EV 12. In this way, the EV 12 and the charging station 17 are both able to request the discharge session, and do so by sending out their negative limits first and allowing the other side to acknowledge the request. The EV 12 and the charging station 17 thus jointly agree that the impending session will be conducted as a discharge session. The method 100 then proceeds to block B108.

Block B108 includes evaluating the power and current limits from block B106 to determine if the communicated limits correspond to the predetermined negative range, e.g., 700 kW-870 kW. The method 100 proceeds to block B110 when the communicated power and current limits correspond to the predetermined negative range, and to block B116 in the alternative.

At block B110, the EV 12 resends its power/current limits to the offboard charging station 17. When confirming a request from the charging station 17 for DC power from the EV 12, block B110 entails transmitting negative power and current limits back to the charging station 17 using the established power line communication. Thus, transmittal of the limits outside of the designated or agreed upon negative limits could indicate non-confirmation, or an inability of the EV 12 to provide the desired power and current levels during a discharge session. The method 100 then proceeds to block B112.

Block B112 includes determining, via the processor P1 of the charge controller 22 of FIG. 1, whether the communicated limits from the EV 12 correspond to negative limits. The method 100 proceeds to block B114 when this is the case, and to block B116 in the alternative when the power and current limits from the EV 12 are not in the agreed upon negative range.

Block B114 ("EVSE ID=OK?") provides an optional strategy for added security and protection measures prior to commencing the discharge session. As will be appreciated by those skilled in the art, the availability of power stored within the onboard power supply 31 of FIG. 1 may be a tempting target for nefarious individuals. This is true regardless of whether grid power is available. To prevent energy theft, and to ensure that specific charging stations 17 are "trusted" for the purpose of continuing with the discharge session, the charging station 17 may at block B114 transmit a unique identifier code to the EV 12, the processor P2 of which may verify the identifier code by comparing it to a calibrated list of approved identifier codes.

For example, the unique identifier code may be some or all of a MAC address of the charging station 17, e.g., the entire MAC address or the upper three bytes thereof, with the upper three bytes of a MAC address corresponding to a specific manufacturer as the "organizationally unique identifier" or OUI. Thus, the discharge session contemplated herein may be used with a limited number of approved EVSE manufacturers, with block B114 vehicle checking the MAC address/OUI against a list of approved OUIs to determine if the charging station 17 is one that supports discharge in accordance with the present protocol. The method 100 proceeds to block B118 when the identifier code is an approved identifier code, and to block B116 in the alternative when the identifier code is not on the approved list.

Block B116 includes initiating a normal DC charging session (INIT $DC_{CHG}$) in response to negative decisions at blocks B108, B112, or B114, i.e., when the communicated power and current limits of block B108 are outside of the agreed upon negative limit range or if at optional step B114 the unique identifier does not correspond to an approved supplier. The method 100 then proceeds to terminal block B120.

Block B118 (INIT $DC_{DISCHG}$) includes initiating the DC discharge session in response to affirmative decisions at blocks B108, B112, or B114, i.e., when the communicated power/current limits of block B108 are within the agreed upon negative limit range and, if optional block B114 is used, that the unique identifier corresponds to an approved EVSE supplier. The method 100 then proceeds to terminal block B120.

At terminal block B120, the default charging or the present discharging session may continue in the usual manner based on the ongoing communication of CP and PRX power signals, as appreciated in the art. During a current demand phase of the discharge session, the processor P2 aboard the EV 12 may be configured to receive a zero value indicative of a confirmation by the charging station 17 of a continued validity status of the discharge session, i.e., that continuation of the discharge session is desired.

The method 100 is thus adapted for coordinating a discharge session in which DC power is offloaded from the onboard power supply 31 of the EV 12 shown in FIG. 1 to the charging station 17. The method 100 in general proceeds as follows: (1) in response to a connection of the onboard power supply 31 to the offboard charging station 17 via the charging cord set 16, charging data is exchanged between the processor P2 of the EV 12 and the processor P1 of the offboard charging station 17. This occurs over a low-voltage CP line, as noted above, with the charging data including respective power and current limits of the EV 12 and the charging station 17.

Then, in response to the power and current limits of the charging station 17 being in a predetermined range indicative of negative power and current limits, i.e., a request for offloaded power from the onboard power supply 31, the method 100 proceeds by transmitting the power and current limits of the EV 12 to the charging station 17, thereby confirming the request. The method 100 proceeds by commencing the discharge session via the processor P2 of the EV 12 in response to confirming the request. The method 100 may be alternatively embodied as computer-readable instructions recorded on a computer-readable storage medium. In such an embodiment, the execution of the instructions by the processor P2 of the EV 12 causes the EV 12 to perform the method 100 as set forth above.

The method 100 as described above is thus able to achieve DC energy discharge mode of operation within the construct of standardized EV charging communication. In this way, the charging station 17 and the EV 12 require minimal additional logic for coordinated entry into discharge mode, leading to customer features such as home energy backup, V2G transfer, etc. These and other potential benefits will be readily appreciated by those skilled in the art in view of the foregoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A method for coordinating a discharge session in which direct current (DC) power is offloaded from a power supply of an electrical system to a bidirectional offboard charging station, the bidirectional offboard charging station being connected to alternating current (AC) grid power, the method comprising:

in response to a connection of the power supply to the offboard charging station via a charging cord set during a power outage of the AC grid power, exchanging charging data between a processor of the electrical system and a processor of the offboard charging station over a low-voltage communication line, the charging data including power and current limits of the electrical system and power and current limits of the offboard charging station;

assigning an unused range in respective power and current limits of the electrical system and the offboard charging station, the unused range being a designated upper portion of a protocol-specific range, the designated upper portion of the protocol-specific range being indicative of negative power and current limits and represents a request for the discharge session;

in response to the power and current limits of the offboard charging station being in the designated upper portion of the protocol-specific range, transmitting the power and current limits of the electrical system to the offboard charging station, thereby confirming the request for the discharge session; and initiating the discharge session via the processor of the electrical system in response to confirming the request.

2. The method of claim 1, further comprising:
receiving a unique identifier code from the offboard charging station using the processor of the electrical system; and
initiating the discharge session when the unique identifier code matches a predetermined identifier code on a calibrated list of approved identifier codes.

3. The method of claim 2, wherein the unique identifier code includes at least a portion of a MAC address of the offboard charging station.

4. The method of claim 1, wherein the negative power and current limits are communicated via a voltage signal having the protocol-specific range.

5. The method of claim 4, wherein the protocol-specific range is 0 kW to 870 kW and 0 A to 870 A, the designated portion of the protocol-specific range is 700 kW to 870 kW and 700 A to 870 A, and the designated portion of the protocol-specific range corresponds to 0 kW to −170 kW and 0 A to −170 A.

6. The method of claim 1, wherein the discharge session is characterized by an absence of a cable check process and occurs during a power outage of grid power to the offboard charging station.

7. The method of claim 6, further comprising:
during a pre-charge stage conducted during the power outage prior to the discharge session, opening a set contactors of the offboard charging station;
detecting a DC link voltage across a DC link capacitor of the electrical system; and
in response to the DC link voltage being at or near 0 volts, closing the set contactors of the offboard charging station in a predetermined sequence.

8. The method of claim 1, further comprising:
during a current demand phase of the discharge session, receiving a zero value via the processor of the electrical system, the zero value being indicative of a confirmation by the offboard charging station of a continued validity status of the discharge session.

9. An electric vehicle (EV) comprising:
a set of road wheels; and
an electrified powertrain system having a processor, a direct current (DC) power supply, and an electric traction motor, wherein the DC power supply is connected to the electric traction motor, the electric traction motor is connected to one or more of the road wheels, and the processor is configured to coordinate a discharge session in which DC power is offloaded from the DC power supply to a bidirectional offboard charging station connected to alternating current (AC) grid power, wherein the processor is configured to:
in response to a connection of the DC power supply to the offboard charging station via a charging cord set during a power outage of the AC grid power, exchange charging data with a processor of the offboard charging station over a low-voltage communication line, the charging data including power and current limits of the EV and power and current limits of the offboard charging station;
assign an unused range in respective power and current limits of the electrical system and the offboard charging station, the unused range being a designated upper portion of a protocol-specific range indicative of negative power and current limits representing a request for the discharge session;
in response to the power and current limits of the offboard charging station being in the designated upper portion of the protocol-specific range, transmit the power and current limits of the EV to the offboard charging station, thereby confirming the request for the discharge session; and
initiate the discharge session in response to confirming the request.

10. The EV of claim 9, wherein the processor of the EV is configured to receive a unique identifier code from the processor of the offboard charging station, and to initiate the discharge session when the unique identifier code matches a predetermined identifier code on a calibrated list of approved identifier codes.

11. The EV of claim 10, wherein the unique identifier code includes at least a portion of a MAC address of the offboard charging station.

12. The EV of claim 9, wherein the negative power and current limits are communicated via a voltage signal having a protocol-specific range.

13. The EV of claim 12, wherein the protocol-specific range is 0 kW to 870 kW and 0 A to 870 A, the designated portion of the protocol-specific range is 700 kW to 870 kW and 700 A to 870 A, and the designated portion of the protocol-specific range corresponds to 0 kW to −170 kW and 0 A to −170 A.

14. The EV of claim 9, wherein the processor of the EV is configured to initiate the discharge session in response to confirming the request, the discharge session is characterized by an absence of a cable check process, and the discharge session occurs during a power outage of grid power to the offboard charging station.

15. The EV of claim 14, wherein the electrified powertrain system includes a set of pack contactors, a DC link capacitor, and a set of DC charging contactors, wherein the processor of the EV is configured, during a pre-charge stage conducted during the power outage prior to the discharge session, opening the set of pack contactors to thereby disconnect the DC power supply from the offboard charging station, and close the set of DC charging contactors to charge the DC link capacitor.

16. The EV of claim 9, wherein during a current demand phase of the discharge session, the processor of the EV is configured to receive a zero value indicative of a confirmation by the offboard charging station of a continued validity status of the discharge session.

17. A computer-readable storage medium on which instructions are recorded for coordinating a discharge session in which direct current (DC) power is offloaded from a power supply of an electric vehicle (EV) to a bidirectional offboard charging station connected to alternating current (AC) grid power, wherein execution of the instructions by a processor of the EV causes the EV to:
in response to a connection of the power supply to the offboard charging station via a charging cord set during a power outage of the AC grid power, exchange charging data between the processor of the EV and a processor of the offboard charging station over a low-voltage Control Pilot (CP) line, the charging data including power and current limits of the EV and power and current limits of the offboard charging station;
assign an unused range in respective power and current limits of the electrical system and the offboard charging station, the unused range being a designated upper portion of a protocol-specific range, wherein the designated upper portion of the protocol-specific range is indicative of negative power and current limits representing a request for the discharge session;
in response to the power and current limits of the offboard charging station being in the designated upper portion of the protocol-specific range, transmit the power and current limits of the EV to the offboard charging station, thereby confirming the request for the discharge session; and initiate the discharge session via the processor of the EV in response to confirming the request.

18. The computer-readable storage medium of claim 17, wherein execution of the instructions by the processor of the EV causes the processor to:

receive a MAC address from the offboard charging station; and initiate the discharge session when the MAC address or a portion thereof matches a predetermined identifier code on a calibrated list of approved identifier codes.

19. The computer-readable storage medium of claim 17, wherein the negative power and current limits are communicated as an electrical signal corresponding to 0 kW to −170 kW or 0 A to −170 A.

20. The computer-readable storage medium of claim 17, wherein the processor of the EV is configured, during a current demand phase of the discharge session, to receive a zero value indicative of a confirmation by the offboard charging station of a continued validity status of the discharge session.

* * * * *